(12) United States Patent
Herrmann et al.

(10) Patent No.: US 12,305,726 B2
(45) Date of Patent: May 20, 2025

(54) MULTI-LAYER AIRCRAFT BRAKE INSULATOR

(71) Applicant: GOODRICH CORPORATION, Charlotte, NC (US)

(72) Inventors: Nathaniel J. Herrmann, Springfield, OH (US); Wenping Zhao, Glastonbury, CT (US)

(73) Assignee: GOODRICH CORPORATION, Charlotte, NC (US)

( * ) Notice: Subject to any disclaimer, the term of this patent is extended or adjusted under 35 U.S.C. 154(b) by 367 days.

(21) Appl. No.: 17/833,308

(22) Filed: Jun. 6, 2022

(65) Prior Publication Data

US 2023/0392657 A1 Dec. 7, 2023

(51) Int. Cl.
| | | |
|---|---|---|
| F16D 65/12 | (2006.01) | |
| B32B 3/26 | (2006.01) | |
| B32B 7/05 | (2019.01) | |
| B32B 9/00 | (2006.01) | |
| B32B 9/04 | (2006.01) | |
| B32B 15/08 | (2006.01) | |

(Continued)

(52) U.S. Cl.
CPC ............ F16D 65/128 (2013.01); B32B 3/266 (2013.01); B32B 7/05 (2019.01); B32B 9/005 (2013.01); B32B 9/041 (2013.01); B32B 15/08 (2013.01); B64C 25/42 (2013.01); F16D 65/095 (2013.01); F16D 65/78 (2013.01); B32B 2307/304 (2013.01); B32B 2605/18 (2013.01); F16D 2065/785 (2013.01)

(58) Field of Classification Search
CPC ...... F16D 65/128; F16D 65/095; F16D 65/78; F16D 2065/785; F16D 55/36; B64C 25/42; B32B 3/266; B32B 7/05; B32B 15/08; B32B 9/041; B32B 9/005; B32B 2307/304; B32B 2605/18; B32B 2605/785

See application file for complete search history.

(56) References Cited

U.S. PATENT DOCUMENTS

| | | |
|---|---|---|
| 4,147,241 A | 4/1979 | Preniczny et al. |
| 4,798,270 A | 1/1989 | Schneider et al. |

(Continued)

FOREIGN PATENT DOCUMENTS

| | | |
|---|---|---|
| CN | 2928678 | 8/2007 |
| CN | 104895970 | 9/2015 |

(Continued)

OTHER PUBLICATIONS

European Patent Office, European Search Report dated Oct. 11, 2023 in Application No. 23175809.5.

(Continued)

*Primary Examiner* — Pamela Rodriguez
(74) *Attorney, Agent, or Firm* — SNELL & WILMER L.L.P.

(57) ABSTRACT

An aircraft brake insulator assembly for a brake mechanism of an aircraft includes a torque barrel assembly and a multi-layer insulator. The torque barrel assembly includes a torque plate and a torque barrel coupled to the torque plate. The multi-layer insulator is configured to be located between a piston housing of the brake mechanism and the torque plate. The multi-layer insulator includes a first insulator layer and a second insulator layer contacting the first insulator layer.

20 Claims, 6 Drawing Sheets

(51) Int. Cl.
    *B64C 25/42*     (2006.01)
    *F16D 65/095*     (2006.01)
    *F16D 65/78*     (2006.01)

(56) References Cited

U.S. PATENT DOCUMENTS

| | | |
|---|---|---|
| 5,107,968 A | 4/1992 | Delpassand |
| 5,538,109 A | 7/1996 | Swank |
| 5,553,689 A | 9/1996 | Chareire |
| 7,909,146 B2 * | 3/2011 | Dyko ............ F16D 55/025 188/71.5 |
| 9,267,557 B2 | 2/2016 | Boyle |
| 10,077,818 B2 | 9/2018 | Whittle et al. |
| 10,598,209 B2 * | 3/2020 | Whittle ............ F16D 65/02 |
| 10,968,971 B2 | 4/2021 | Herrmann et al. |
| 11,292,586 B2 | 4/2022 | Ngatu et al. |
| 2019/0241257 A1 | 8/2019 | Leiva et al. |
| 2020/0325948 A1 | 10/2020 | Todd |

FOREIGN PATENT DOCUMENTS

| | | |
|---|---|---|
| CN | 105179385 | 12/2015 |
| EP | 3524517 | 8/2019 |
| WO | 1990006329 | 6/1990 |
| WO | 2021224239 | 11/2021 |

OTHER PUBLICATIONS

European Patent Office, European Office Action dated Feb. 20, 2025 in Application No. 23175809.5.

\* cited by examiner

MULTI-LAYER AIRCRAFT BRAKE INSULATOR

FIELD

The present disclosure generally relates to aircraft wheel and brake systems and, more particularly, to brake insulators for brake assemblies.

BACKGROUND

Aircraft typically utilize brake systems on wheels to slow or stop the aircraft during landings, taxiing, and rejected takeoffs. The brake systems generally employ a brake stack comprising a series of friction disks that may be forced into sliding contact with one another during brake actuation to slow or stop the aircraft. A torque plate and barrel is employed to support the series of friction disks. The brake systems generally include one or more pistons configured to force the friction disks of the brake stack, or heat sink, into contact with one another. During braking, heat may be transferred from the heat sink to the piston housing and hydraulic fluid via the torque plate.

Existing aircraft brake insulators are composed of phenolic impregnated glass fiber. This material may suffer compression set at elevated operating temperatures resulting in loose brake tie bolts.

SUMMARY

An aircraft brake insulator assembly for a brake mechanism of an aircraft is described herein. The aircraft brake insulator assembly includes a torque barrel assembly and a multi-layer insulator. The torque barrel assembly includes a torque plate and a torque barrel coupled to the torque plate. The multi-layer insulator is configured to be located between a piston housing of the brake mechanism and the torque plate. The multi-layer insulator includes a first insulator layer and a second insulator layer contacting the first insulator layer.

In various embodiments, the first insulator layer includes a first inner circumferential surface, a first outer circumferential surface, a first distal surface extending between the first inner circumferential surface and the first outer circumferential surface, and a first proximal surface oriented away from the first distal surface and extending between the first inner circumferential surface and the first outer circumferential surface.

In various embodiments, the second insulator layer includes a second inner circumferential surface, a second outer circumferential surface, a second distal surface extending between the second inner circumferential surface and the second outer circumferential surface, and a second proximal surface oriented away from the second distal surface and extending between the second inner circumferential surface and the second outer circumferential surface.

In various embodiments, at least a portion of the first proximal surface is contacting the second distal surface.

In various embodiments, at least one of the first proximal surface or the second distal surface includes a plurality of axially extending surface features.

In various embodiments, the axially extending surface features include a hatch pattern, various surface feature asperities, grooves, or projections to increase surface roughness, the axially extending surface features are formed via laser engraving or mechanical roughening of the surfaces.

In various embodiments, the first insulator layer includes a first tab disposed on the first inner circumferential surface and the second insulator layer includes a second tab disposed on the second inner circumferential surface. The first tab and the second tab are configured to be spot welded such that the first insulator layer is coupled to the second insulator layer.

In various embodiments, at least one of the first insulator layer and the second insulator layer is a metal or metal alloy.

In various embodiments, at least one of the first insulator layer and the second insulator layer is a composite material, a ceramic, or a polymer material.

In various embodiments, the multi-layer insulator further includes a third insulator layer, a fourth insulator layer, and a fifth insulator layer, wherein the first, second, third, fourth, and fifth insulator layers are configured to be coupled together forming the multi-layer insulator.

A multi-layer insulator located between a piston housing and a torque plate or an aircraft brake mechanism is described herein. The multi-layer insulator includes a first insulator layer having a first tab and a second insulator layer having a second tab. The second insulator contacts the first insulator layer such that the second tab aligns with the first tab.

In various embodiments, the first insulator layer includes a first inner circumferential surface, a first outer circumferential surface, a first distal surface extending between the first inner circumferential surface and the first outer circumferential surface, and a first proximal surface oriented away from the first distal surface and extending between the first inner circumferential surface and the first outer circumferential surface.

In various embodiments, the second insulator layer includes a second inner circumferential surface, a second outer circumferential surface, a second distal surface extending between the second inner circumferential surface and the second outer circumferential surface, and a second proximal surface oriented away from the second distal surface and extending between the second inner circumferential surface and the second outer circumferential surface.

In various embodiments, at least a portion of the first proximal surface is contacting the second distal surface.

In various embodiments, at least one of the first proximal surface or the second distal surface comprises a plurality of axially extending surface features.

In various embodiments, the axially extending surface features include a hatch pattern, various surface feature asperities, grooves, or projections to increase surface roughness, the axially extending surface features are formed via laser engraving or mechanical roughening of the surfaces.

In various embodiments, the first tab is disposed on the first inner circumferential surface and the second tab is disposed on the second inner circumferential surface. The first tab and the second tab are configured to be spot welded such that the first insulator layer is coupled to the second insulator layer.

In various embodiments, at least one of the first insulator layer and the second insulator layer is a metal, a metal alloy, a composite material, a ceramic, or a polymer material.

In various embodiments, the multi-layer insulator includes a third insulator layer, a fourth insulator layer, and a fifth insulator layer, wherein the first, second, third, fourth, and fifth insulator layers are configured to be coupled together forming the multi-layer insulator.

A method of forming an aircraft brake insulator assembly for a brake mechanism of an aircraft is described herein. The method includes forming a multi-layer insulator configured to be located between a piston housing and a torque plate of the brake mechanism of the aircraft. Forming the multi-layer insulator includes forming a first insulator layer, forming a second insulator layer, and connecting the first insulator layer and second insulator layer so that the second insulator layer is contacting the first insulator layer.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
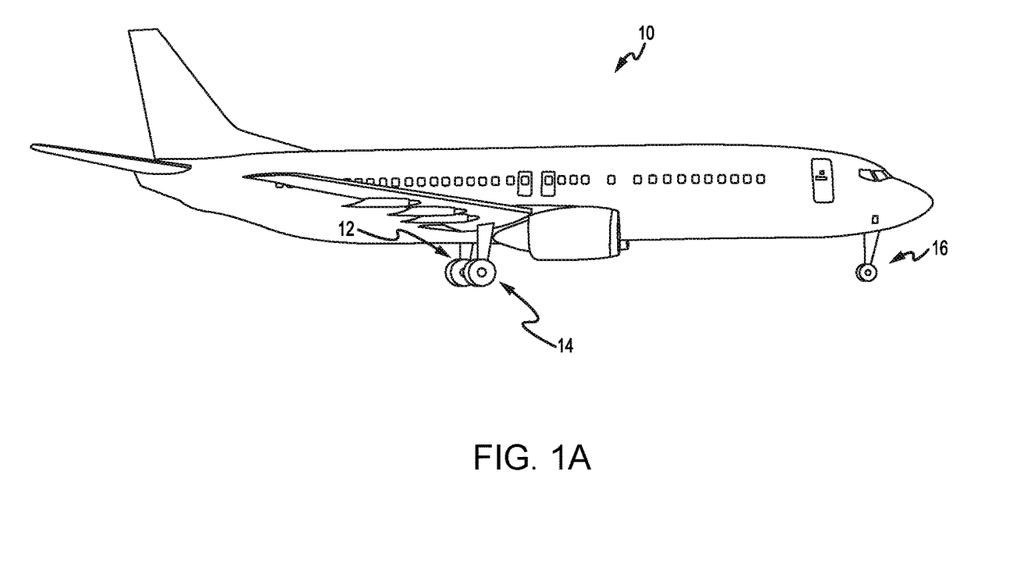
FIG. 1A illustrates an exemplary aircraft having a brake system, in accordance with various embodiments.

Referring to FIG. 1A, in accordance with various embodiments, an aircraft 10 is illustrated. The aircraft 10 includes landing gear, which may include a left main landing gear 12, a right main landing gear 14 and a nose landing gear 16. The landing gear support the aircraft 10 when it is not flying, allowing the aircraft 10 to taxi, take off and land without damage. While the disclosure refers to the three landing gear configurations just referred, the disclosure nevertheless contemplates any number of landing gear configurations.

Figure 1B:
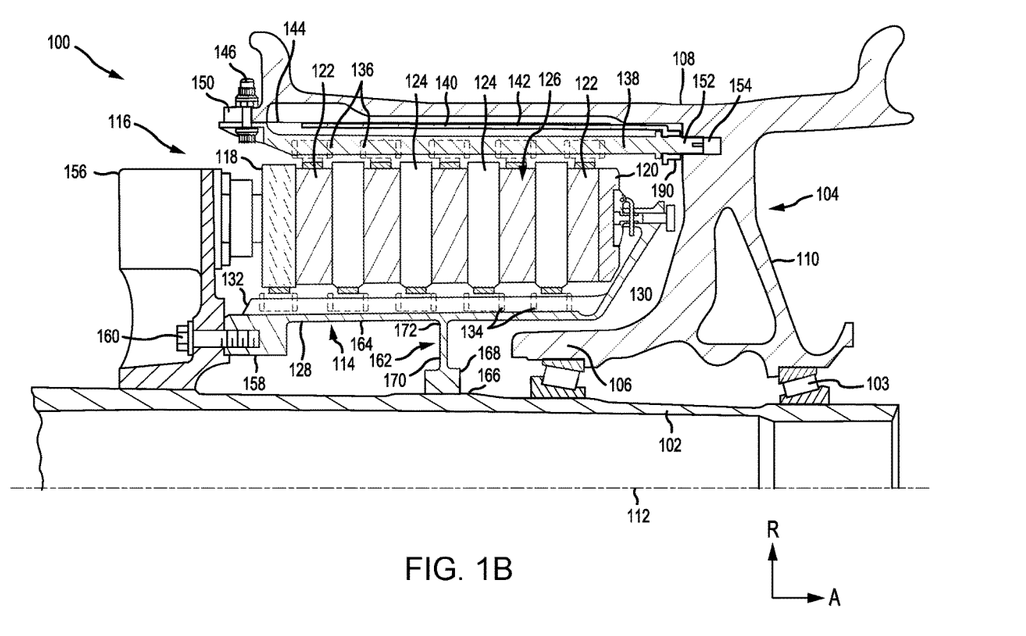
FIG. 1B illustrates a cross-sectional view of a torque barrel assembly, in accordance with various embodiments.

Referring now to FIG. 1B, there is schematically depicted a brake mechanism 100 that may be used by the aircraft 10 of FIG. 1A or any other appropriate aircraft. The brake mechanism 100 is mounted on an axle 102 for use with a wheel 104 disposed on and configured to rotate about the axle 102 via one or more bearing assemblies 103. The wheel 104 includes a hub 106, a wheel well 108 concentric about the hub 106 and a web portion 110 interconnecting the hub 106 and the wheel well 108. A central axis 112 extends through the axle 102 and defines a center of rotation of the wheel 104. A torque plate barrel 114 (sometimes referred to as a torque tube or barrel or a torque plate or back leg) is aligned concentrically with the hub 106, and the wheel 104 is rotatable relative to the torque plate barrel 114.

The brake mechanism 100 includes a piston assembly 116, a pressure plate 118 disposed adjacent the piston assembly 116, an end plate 120 positioned a distal location from the piston assembly 116, and a plurality of rotor disks 122 interleaved with a plurality of stator disks 124 positioned intermediate the pressure plate 118 and the end plate 120. The pressure plate 118, the plurality of rotor disks 122, the plurality of stator disks 124 and the end plate 120 together form a brake heat sink or brake stack 126. The pressure plate 118, the end plate 120 and the plurality of stator disks 124 are mounted to the torque plate barrel 114 and remain rotationally stationary relative to the axle 102.

The torque plate barrel 114 may include an annular barrel or torque tube 128 and an annular plate or back leg 130. The back leg 130 is disposed at an end distal from the piston assembly 116 and may be made monolithic with the torque tube 128, as illustrated in FIG. 1B, or may be made as a separate annular piece and suitably connected to the torque tube 128. The torque tube 128 has a plurality of circumferentially spaced and axially extending splines 132 disposed on an outer surface of the torque tube 128. The plurality of stator disks 124 and the pressure plate 118 include notches or stator slots 134 on an inner periphery of the disks and the plate for engagement with the splines 132, such that each disk and the plate are axially slidable with respect to the torque tube 128.

The end plate 120 is suitably connected to the back leg 130 of the torque plate barrel 114 and is held non-rotatable, together with the plurality of stator disks 124 and the pressure plate 118, during a braking action. The plurality of rotor disks 122, interleaved between the pressure plate 118, the end plate 120 and the plurality of stator disks 124, each have a plurality of circumferentially spaced notches or rotor lugs 136 along an outer periphery of each disk for engagement with a plurality of torque bars 138 that is secured to or made monolithic with an inner periphery of the wheel 104.

An actuating mechanism for the brake mechanism 100 includes a plurality of piston assemblies, including the piston assembly 116, circumferentially spaced around an annular piston housing 156 (only one piston assembly is illustrated in FIG. 1B). Upon actuation, the plurality of piston assemblies affects a braking action by urging the pressure plate 118 and the plurality of stator disks 124 into frictional engagement with the plurality of rotor disks 122 and against the end plate 120. Fluid or hydraulic pressure, mechanical springs or electric actuators, among other mechanisms, may be used to actuate the plurality of piston assemblies. Through compression of the plurality of rotor disks 122 and the plurality of stator disks 124 between the pressure plate 118 and the end plate 120, the resulting frictional contact slows or stops or otherwise prevents rotation of the wheel 104. The plurality of rotor disks 122 and the plurality of stator disks 124 are fabricated from various materials, such as ceramic matrix composites, that enable the brake disks to withstand and dissipate the heat generated during and following a braking action.

The torque plate barrel 114 is secured to a stationary portion of the landing gear such as the axle 102, preventing the torque plate barrel 114 and the plurality of stator disks 124 from rotating during braking of the aircraft. The torque tube 128 portion of the torque plate barrel 114 may be attached to the annular piston housing 156 via an annular mounting surface 158, wherein bolt fasteners 160 secure the torque plate barrel 114 to the annular piston housing 156. A spacer member or pedestal 162 is positioned between an inner diameter surface 164 of the torque tube 128 and an outer diameter surface 166 of the axle 102. The pedestal 162 includes a radially inner surface or foot 168 for engaging the axle 102, a web portion 170 radially outward of the foot 168 and a head portion 172 for engaging the inner diameter surface 164 of the torque tube 128. The pedestal 162 augments support of the torque plate barrel 114 within the brake mechanism 100 generally and, more particularly, against the axle 102. The pedestal 162 may be made monolithic with the torque tube 128 portion of the torque plate barrel 114.

A heat shield 140 is secured directly or indirectly to the wheel 104 between a radially inward surface of the wheel well 108 and the plurality of torque bars 138. As illustrated in FIG. 1B, the heat shield 140 is concentric with the wheel well 108 and may have a plurality of heat shield sections 142 disposed between respective, adjacent pairs of the plurality of torque bars 138. The heat shield 140, or heat shield sections 142, is spaced from the radially inward surface of the wheel well 108 and secured in place by heat shield tabs 190, such that the heat shield 140, or heat shield sections 142, is disposed generally parallel to the axis of rotation or central axis 112 of the wheel 104 and intermediate the plurality of torque bars 138 and the radially inward surface of the wheel well 108. In various embodiments, including for heavy-duty applications, the heat shield 140, or heat shield sections 142, may be further secured in place by heat shield carriers 144.

The plurality of torque bars 138 is attached at axially inboard ends to the wheel 104 by torque bar bolts 146. The torque bar bolts 146 extend through respective holes in a flange 150 provided on the wheel 104 as shown, which flange 150 for purposes of the present description is intended to be considered as part of the wheel well 108. Each of the plurality of torque bars 138 may include a pin 152 or similar member at its axially outboard end (i.e., the end opposite the torque bar bolts 146) that is received within a hole 154 disposed proximate the web portion 110 of the wheel 104. The heat shield 140, or heat shield sections 142, is positioned adjacent a radially inward surface of the wheel well 108 and secured in place by the heat shield tabs 190.

Each torque barrel assembly, or brake assembly, including the torque plate barrel 114, is designed for a specific application and modes of operation. The size (e.g., length, diameter, thickness, etc.) and material of the torque plate barrel 114 may be modified to suit a particular application or improve a mode of operation. Different modes of operation that are considered include whirl, squeal, and disc squeal, just to name a few. Additional design considerations include dynamic stability, such as torsional compliance, axial compliance, and structural asymmetry, and cooling of the torque barrel assembly, including the torque plate barrel 114.

Figure 2A:
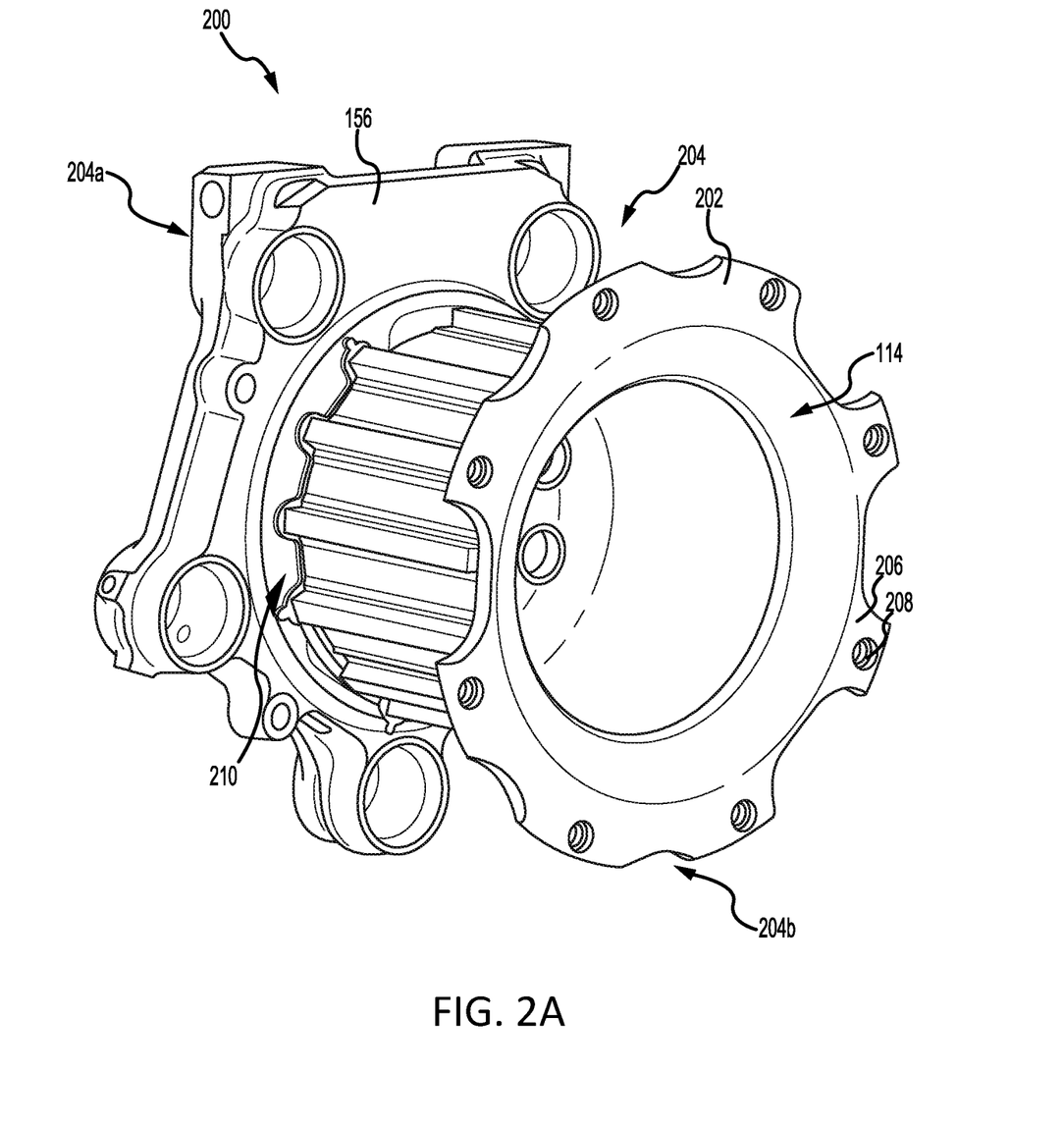
FIGS. 2A-2C illustrates perspective views of an aircraft brake insulator assembly, in accordance with various embodiments.
Figure 2B:
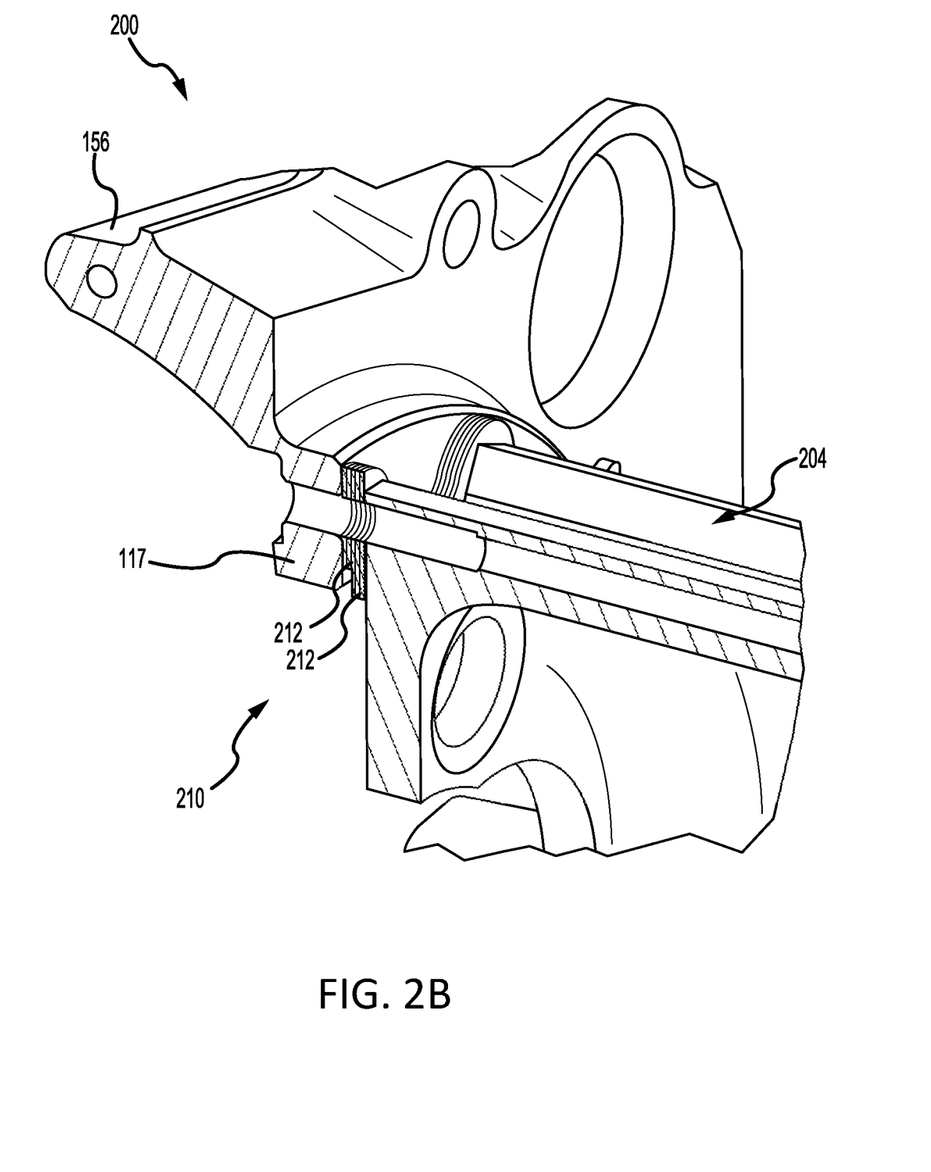
Figure 2C:
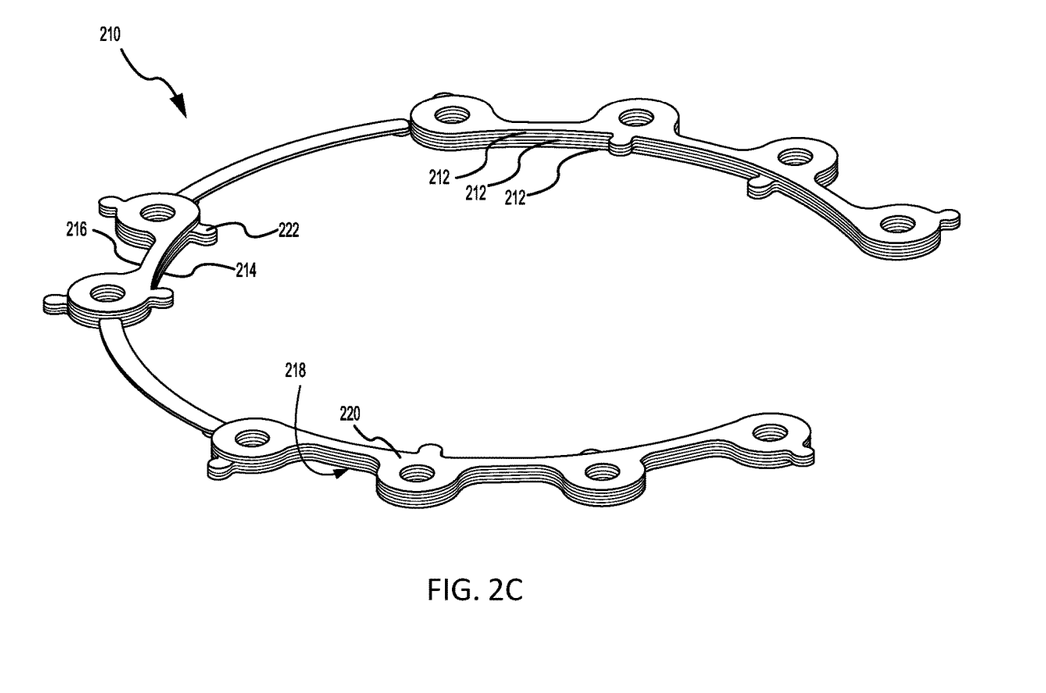

Referring now to FIGS. 2A-2C, there is depicted perspective views of an exemplary aircraft brake insulator assembly 200. The aircraft brake insulator assembly may include torque plate barrel 114. The torque plate barrel 114 includes a torque plate 202 and a torque barrel 204. The torque barrel 204 has a cylindrical, or tubular, structure having an opening at a first end 204a and an opening at an opposing second end 204b. The second end 204b of the torque barrel 204 is coupled to the torque plate 202. In the depicted embodiment, the torque plate barrel 114, i.e., the torque plate 202 and the torque barrel 204, may be formed as single unit. In various embodiments, the torque plate barrel 114 may be formed from separate pieces where the torque barrel 204 and the torque plate 202 are coupled through other means such as welding, riveting, etc. FIG. 2A depicts a perspective view of the aircraft brake insulator assembly 200 from the second end 204b of the torque barrel 204. FIG. 2B depicts an enlarged perspective view of a portion of the aircraft brake insulator assembly 200.

The torque plate 202 includes back legs 206 that are circumferentially disposed around the outer edge of the torque plate 202. Each back leg 206 has a hole 208 disposed therein for mounting the torque plate barrel 200, specifically for mounting the torque plate 202, to a torque barrel assembly. Each back leg 206 may be uniformly spaced around the circumference of the torque plate 202 to provide uniform support when mounting to the torque barrel assembly.

The torque barrel 204 extends from the torque plate 202 at the second end 204b to the pressure plate 118 at the first end 204a. The torque barrel has a first length L1 that extends axially from the first end 204a to the second end 204b of the torque barrel 204.

The torque barrel 204 may be attached to the annular piston housing 156. For instance, the torque barrel 204 may be attached to the annular piston housing 156 via the annular mounting surface 158, as described herein.

Referring still to FIGS. 2A-2C, the aircraft brake insulator assembly 200 includes a multi-layer insulator 210. Beneficially, the multi-layer insulator 210 reduces loosening of the tie bolts, reduces weight, and reduces cost while maintaining insulating performance. FIG. 2C depicts a perspective view of the multi-layer insulator 210. The multi-layer insulator 210 leverages contact resistance between each layer and stronger materials to avoid compression set.

The multi-layer insulator 210 includes a plurality of insulator layers 212. For instance, in various embodiments the multi-layer insulator 210 includes three insulator layers 212. In various embodiments the multi-layer insulator 210 includes five insulator layers 212. In various embodiments, insulator layers 212 may be a metal or metal alloy. For example, insulator layers 212 may include stainless steel, aluminum, titanium, nickel, and/or alloys thereof. As high temperature, stronger materials, relative to phenolic impregnated glass fiber for instance, multiple layers of thin sheet metal have the capability for the loading and temperature environment that the multi-layer insulator 210 may be exposed, thus reducing compression set. Stacking multiple (e.g., five) insulator layers 212 creates a multi-layer insulator 210 that retains its strength at temperature. The insulator layers 212 have contact resistance between each layer that slows the heat transfer from the torque plate 114 into the piston housing 156.

In various embodiments, insulator layers 212 may comprise a composite material, a ceramic, a polymer material such as silicone rubber, cyanate ester, bismaleimide (BMI) and polyimide, metals, or any other thermally insulating material. In various embodiments, insulator layers 212 may include a carbon composite material configured to reduce thermal conduction in the axial direction, for example, a thermal conductivity of the carbon composite material in the axial direction may be less than a thermal conductivity of the carbon composite material in the radial direction. In various embodiments, insulator layers 212 may be alternating material types. For instance, the first, third, and fifth layers may be metal while the second and fourth layers are a carbon composite. In various embodiments, an insulator layer 212 may be a phenolic glass fiber. For instance, considering the torque plate is the hot element while in use and thereafter, a high strength, high temperature capability metal may be used on the hot side of the bolt joint and a phenolic glass fiber impregnated type material may be incorporated on the opposite side of the insulator bolted joint, such that the temperature slows down to a point where compression set may be reduced or not occur. Stacking multiple layers of thin sheet or alternating layers of thin metal and engineered fiber reinforced plastics leverages thermal contact resistance and use of higher strength metallics mitigates compression set.

With reference to FIG. 2C, the multi-layer insulator 210 is illustrated in accordance with various embodiments. Each insulator layer 212 includes an inner circumferential surface 214 and an outer circumferential surface 216. Inner circumferential surface 214 is oriented radially inward. Outer circumferential surface 216 is oriented radially outward and generally opposite inner circumferential surface 214. Each insulator layer 212 further includes a distal surface 218 and a proximal surface 220 extending radially from inner circumferential surface 214 to outer circumferential surface 216. Accordingly, the distal surface 218 of one insulator layer 212 is in confronting relation with the proximal surface 220 of the adjacent insulator layer 212. Further, the inner circumferential surface 214 and the outer circumferential surface 216 of each insulator layer 212 are in alignment.

The multi-layer insulator 210 may be generally circular. In various embodiments, the multi-layer insulator 210 may form a complete circle. In various embodiments, the multi-layer insulator 210 may have a circumferential gap. In other words, the multi-layer insulator 210 may be in a shape of a horseshoe. Accordingly, the contact area is sized to the compression load distribution, i.e., the stress of the tie bolt preload. A reduction in surface area reduces heat transfer, weight, and cost.

Each insulator layer 212 may further comprise at least one tab 222. For instance, the insulator layers 212 may be laser cut to the shape described herein and include at least one tab disposed on the inner circumferential surface 214. In various embodiments, the insulator layer 212 may include six tabs 222. The tabs 222 of the insulator layers 212 are configured to be spot welded together. For instance, the tab 222 of the top two insulator layers 212 may be spot welded to the center insulator layer 212 and the bottom two insulator layers 212 may be spot welded to the center insulator layer 212 such that five insulator layers 212 are coupled together to form the multi-layer insulator 210.

Figure 3:
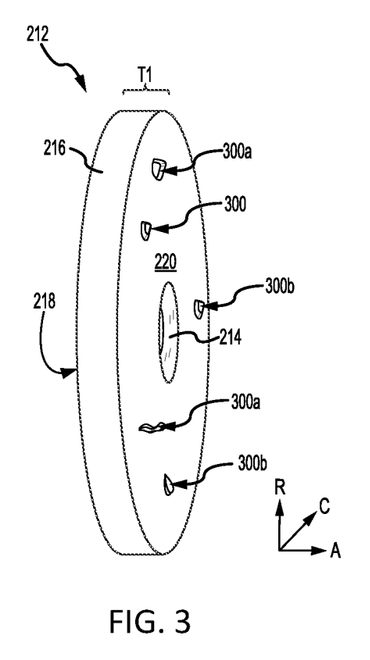
FIGS. 3 and 4 illustrate surfaces of an insulator layer of the aircraft brake insulator assembly of FIGS. 2A-2C, in accordance with various embodiments.
Figure 4:
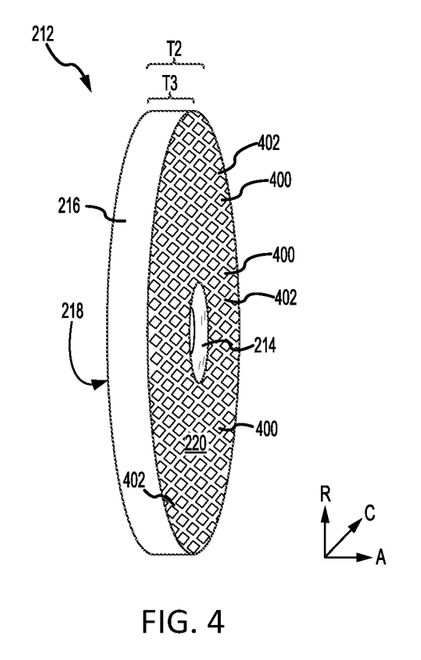

In various embodiments, referring now to FIGS. 3 and 4, the distal surface 218 and/or the proximal surface 220 of each insulator layer 212 may be laser engraved. For instance, the respective surfaces may incorporate a hatch pattern to increase surface roughness. Contact resistance may be further enhanced and thermal conduction reduced via laser engraving or mechanical roughening of the surfaces. For instance, distal surface 218 and proximal surface 220 may each include various surface feature asperities 300, for example, grooves 300a and projections 300b (e.g., see FIG. 3). An axial thickness of insulator layer 212 varies at the asperities 300, such that the axial thickness of insulator layer 212 at a groove 300b is less than an axial thickness T1 from distal surface 218 to proximal surface 220, and the axial thickness of insulator layer 212 at a projection 300b is greater than the axial thickness T1 from distal surface 218 to proximal surface 220.

In various embodiments, insulator layer 212 may include a plurality of axially extending surface features 400 (e.g., see FIG. 4). For instance, surface features 400 may extend (i.e., protrude) from proximal surface 220. Surface features 400 may be formed by cutting, pressing, rolling, additive manufacturing (e.g., 3D printing) or otherwise forming a pattern of straight, angle, or crossed indentations (i.e., grooves, cross hatches) into insulator layer 212, thereby forming raised, or protruding, surface features between indentations 402. Surface features 400 may also be formed over distal surface 218. In various embodiments, surface features 400 may have a generally pyramid, or frustopyramidal shape. The axial thickness of insulator layer 212 varies at surface features 400, such that an axial thickness T2 of insulator layer 212 at a surface feature is greater than the axial thickness T3 at indentations 402.

Varying axial thickness of insulator layers 212 and thus limiting or reducing the contact interfaces between adjacent insulator layers 212 (i.e., the areas where one insulator layer 212 is in direct contact with an adjacent insulator layer 212) may reduce thermal contact area and increase thermal contact resistance through multi-layer insulator 210, which reduces thermal conductance. The number of insulator layers 212, the axial thickness of each insulator layer 212, and surface finish (e.g., axially extending surface features) of each insulator layer 212 may be tuned to meet various requirements. For example, thermal conductance may be reduced by increasing the number of insulator layers 212 (and thus creating a greater number of contact interfaces) within multi-layer insulator 210. The number of insulator layers 212 may be increased by reducing the axial thickness of each insulator layer 212.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. An aircraft brake insulator assembly for a brake mechanism of an aircraft, the aircraft brake insulator assembly comprising:
   a torque barrel assembly comprising:
      a torque plate; and
      a torque barrel coupled to the torque plate; and
   a multi-layer insulator configured to be located between a piston housing of the brake mechanism and the torque plate, the multi-layer insulator comprising:
      a first insulator layer, wherein the first insulator layer comprises:
         a first inner circumferential surface,
         a first outer circumferential surface, wherein a distance between the first inner circumferential surface and the first outer circumferential surface varies; and
      a second insulator layer contacting the first insulator layer.

2. The aircraft brake insulator assembly of claim 1, wherein the first insulator layer comprises a first distal surface extending between the first inner circumferential surface and the first outer circumferential surface, a first proximal surface oriented away from the first distal surface and extending between the first inner circumferential surface and the first outer circumferential surface, and a first thickness between the first distal surface and the first proximate surface.

3. The aircraft brake insulator assembly of claim 2, wherein the second insulator layer comprises a second inner circumferential surface, a second outer circumferential surface, a second distal surface extending between the second inner circumferential surface and the second outer circumferential surface, a second proximal surface oriented away from the second distal surface and extending between the second inner circumferential surface and the second outer circumferential surface, and a second thickness between the second distal surface and second first proximate surface.

4. The aircraft brake insulator assembly of claim 3, wherein at least a portion of the first proximal surface is contacting the second distal surface.

5. The aircraft brake insulator assembly of claim 3, wherein at least one of the first proximal surface or the second distal surface comprises a plurality of axially extending surface features such that at least one of the first thickness or the second thickness varies.

6. The aircraft brake insulator assembly of claim 5, wherein the axially extending surface features include a hatch pattern, various surface feature asperities, grooves, or projections to increase surface roughness, the axially extending surface features are formed via laser engraving or mechanical roughening of the surfaces.

7. The aircraft brake insulator assembly of claim 3, wherein the first insulator layer comprises a first tab disposed on the first inner circumferential surface and the second insulator layer comprises a second tab disposed on the second inner circumferential surface, wherein the first tab and the second tab are configured to be spot welded such that the first insulator layer is coupled to the second insulator layer.

8. The aircraft brake insulator assembly of claim 1, wherein at least one of the first insulator layer and the second insulator layer is a metal or metal alloy.

9. The aircraft brake insulator assembly of claim 1, wherein at least one of the first insulator layer and the second insulator layer is a composite material, a ceramic, or a polymer material.

10. The aircraft brake insulator assembly of claim 1, further comprising a third insulator layer, a fourth insulator layer, and a fifth insulator layer, wherein the first, second, third, fourth, and fifth insulator layers are configured to be coupled together forming the multi-layer insulator.

11. A multi-layer insulator located between a piston housing and a torque plate or an aircraft brake mechanism, the multi-layer insulator comprising:

a first insulator layer having a first tab and comprising a first inner circumferential surface, the first inner circumferential surface being non-uniform; and a second insulator layer having a second tab and comprising a second inner circumferential surface, the second inner circumferential surface being non-uniform, the second insulator layer contacting the first insulator layer such that the second tab aligns with the first tab.

12. The multi-layer insulator of claim 11, wherein the first insulator layer comprises a first outer circumferential surface, a first distal surface extending between the first inner circumferential surface and the first outer circumferential surface, and a first proximal surface oriented away from the first distal surface and extending between the first inner circumferential surface and the first outer circumferential surface.

13. The multi-layer insulator of claim 12, wherein the second insulator layer comprises a second outer circumferential surface, a second distal surface extending between the second inner circumferential surface and the second outer circumferential surface, and a second proximal surface oriented away from the second distal surface and extending between the second inner circumferential surface and the second outer circumferential surface.

14. The multi-layer insulator of claim 13, wherein at least a portion of the first proximal surface is contacting the second distal surface.

15. The multi-layer insulator of claim 13, wherein at least one of the first proximal surface or the second distal surface comprises a plurality of axially extending surface features.

16. The multi-layer insulator of claim 15, wherein the axially extending surface features include a hatch pattern, various surface feature asperities, grooves, or projections to increase surface roughness, the axially extending surface features are formed via laser engraving or mechanical roughening of the surfaces.

17. The multi-layer insulator of claim 13, wherein the first tab is disposed on the first inner circumferential surface and the second tab is disposed on the second inner circumferential surface, wherein the first tab and the second tab are configured to be spot welded such that the first insulator layer is coupled to the second insulator layer.

18. The multi-layer insulator of claim 11, wherein at least one of the first insulator layer and the second insulator layer is a metal, a metal alloy, a composite material, a ceramic, or a polymer material.

19. The multi-layer insulator of claim 11, further comprising a third insulator layer, a fourth insulator layer, and a fifth insulator layer, wherein the first, second, third, fourth, and fifth insulator layers are configured to be coupled together forming the multi-layer insulator.

20. A method of forming an aircraft brake insulator assembly for a brake mechanism of an aircraft, the method comprising:

forming a multi-layer insulator configured to be located between a piston housing and a torque plate of the brake mechanism of the aircraft, wherein forming the multi-layer insulator comprises:
  forming a first insulator layer comprising:
    a first inner circumferential surface,
    a first outer circumferential surface, wherein a distance between the first inner circumferential surface and the first outer circumferential surface varies forming a second insulator layer, and
  connecting the first insulator layer and second insulator layer so that the second insulator layer is contacting the first insulator layer.

\* \* \* \* \*